US010078671B2

(12) United States Patent
Eliáš et al.

(10) Patent No.: US 10,078,671 B2
(45) Date of Patent: Sep. 18, 2018

(54) DATA HUB ARCHITECTURE TO PROVIDE ACTIONABLE DATA FROM REMOTE SENSOR FEEDS

(71) Applicant: Red Hat, Inc., Raleigh, NC (US)

(72) Inventors: Filip Eliáš, Vysni Lhoty (CZ); Filip Nguyen, Brno (CZ)

(73) Assignee: RED HAT, INC., Raleigh, NC (US)

( * ) Notice: Subject to any disclaimer, the term of this patent is extended or adjusted under 35 U.S.C. 154(b) by 608 days.

(21) Appl. No.: 14/633,065

(22) Filed: Feb. 26, 2015

(65) Prior Publication Data
US 2016/0253394 A1 Sep. 1, 2016

(51) Int. Cl.
G06F 7/00 (2006.01)
G06F 17/00 (2006.01)
G06F 17/30 (2006.01)

(52) U.S. Cl.
CPC .. G06F 17/30545 (2013.01); G06F 17/30442 (2013.01); G06F 17/30554 (2013.01)

(58) Field of Classification Search
CPC ......... G06F 17/30442; G06F 17/30545; G06F 17/30554; G06F 17/3033; G06F 17/30516
See application file for complete search history.

(56) References Cited

U.S. PATENT DOCUMENTS

| 7,406,473 | B1 * | 7/2008 | Brassow | G06F 17/30067 |
| 2005/0203993 | A1 * | 9/2005 | Grobman | H04L 61/1552 |
| | | | | 709/203 |
| 2007/0242661 | A1 * | 10/2007 | Tran | H04L 29/1216 |
| | | | | 370/352 |
| 2008/0235746 | A1 * | 9/2008 | Peters | H04N 7/17318 |
| | | | | 725/111 |
| 2009/0058635 | A1 * | 3/2009 | LaLonde | A61N 1/37282 |
| | | | | 340/539.11 |
| 2010/0125545 | A1 * | 5/2010 | Navas | G06F 17/30516 |
| | | | | 707/602 |
| 2012/0110373 | A1 * | 5/2012 | Muller | H04L 12/437 |
| | | | | 714/4.11 |

(Continued)

FOREIGN PATENT DOCUMENTS

| CN | 102882836 | 1/2013 |
| CN | 103200242 | 7/2013 |

OTHER PUBLICATIONS

"Big Data Analytics, Making Sense of the Internet of Things, a hierarchy of analytics—the DIKW pyramid", AGT International, 3 pages. https://www.agtinternational.com/technology/big-data/.

(Continued)

*Primary Examiner* — Te Y Chen
*Assistant Examiner* — Susan Chen
(74) *Attorney, Agent, or Firm* — Haynes and Boone, LLP

(57) ABSTRACT

Systems and methods are provided for data hub architecture to provide actionable data from remote sensor feeds. An exemplary method includes receiving, by a master hub of a plurality of data hubs, a request to access at least one first sensor in a first location and at least one second sensor in a second location from a data client, wherein the master hub is closest to the data client of the plurality of data hubs on a network, determining a first data hub that is closest to the at least one first sensor on the network, and determining a second data hub that is closest to the at least one second sensor on the network. The method further includes querying the first data hub and the second data hub for data and communicating the data to the data client.

20 Claims, 4 Drawing Sheets

(56) References Cited

U.S. PATENT DOCUMENTS

| | | | |
|---|---|---|---|
| 2012/0284777 A1 | 11/2012 | Eugenio et al. | |
| 2013/0090744 A1* | 4/2013 | Tran | G05B 11/01 |
| | | | 700/9 |
| 2013/0103729 A1* | 4/2013 | Cooney | G06F 17/30126 |
| | | | 707/831 |
| 2014/0222813 A1 | 8/2014 | Yang et al. | |
| 2014/0297826 A1 | 10/2014 | Park | |
| 2014/0337263 A1 | 11/2014 | Zhu | |
| 2014/0341085 A1* | 11/2014 | Suryavanshi | H04L 65/1016 |
| | | | 370/260 |

OTHER PUBLICATIONS

European Editors, "How to Interface Sensors to the Internet of Things", Digi-Key Corporation, Article Library, Oct. 31, 2013, 5 pages, Publitek European Editors. http://www.digikey.com/en/articles/techzone/2013/oct/how-to-interface-sensors-to-the-internet-of-things.

Finley, Klint, "The Internet of Anything: A Social Network for the World's Online Sensors", Wired, Dec. 8, 2014, 4 pages. http://www.wired.com/2014/12/the-internet-of-anything-opensensorsio/.

Boman et al, "Flexible IoT Middleware for Integration of Things and Applications", COLLABORATECOM Oct. 22-25, 2014, 8 pages, Miami, United States, DOI 10.4108/icst.collaboratecom.2014.257533. https://www.google.co.in/url?sa=t&rct=j&q=&esrc=s&source=web&cd=4&cad=rja&uact=8&ved=0CC8QFjAD&url=http%3A%2F%2Feudl.eu%2Fpdf%2F10.4108%2Ficst.collaboratecom.2014.257533&ei=16zAVKbLNoTkUrWDg4gC&usg=AFQjCNHHceK-yAYaL57TDBdwt4G7Z2eetw&bvm=bv.83829542,d.bGQ.

* cited by examiner

DATA HUB ARCHITECTURE TO PROVIDE ACTIONABLE DATA FROM REMOTE SENSOR FEEDS

FIELD OF DISCLOSURE

The present disclosure generally relates to a network of distributed computing systems and more particularly to utilizing data hubs on a network that are nearby sensors to receive data from the sensors with little to no delay so that a master hub aware of the delay between the master hub and the data hub may provide the data to a data client in an actionable form by taking into account the delay between the master hub and the data hub.

BACKGROUND

The Internet of Things (IoT) is a concept in future computing and networking that utilizes a network of sensors with associated electronics, software, and communication modules to connect physical objects and other real world existing items into a network. The IoT extends beyond existing machine to machine communications to include a wide variety of devices associated with real world things, such as implants, real world condition detecting sensors (e.g., connected temperature gauges, barometers, etc.), biochips, and/or other types of devices and applications. The IoT may merge several types of technologies, such as embedded systems, controls, sensors, and/or wireless communications. Utilizing the IoT, users may be able to receive data, manipulate devices, and/or communicate information across the world through the network devices. Thus, users may work remotely from physical objects and real world locations and still receive and provide data for use with the physical objects and/or real world locations.

In the IoT, many items and the associated devices, sensors, and/or applications are rich sources of data that may produce data for their associated physical object/real world location. The items included within or attached to the IoT may also correspond to active agents, which may perform some task by a device based on received data (e.g., a start signal, a condition for activation of the device, etc.). Such sensors and/or devices are spread out across the world such that utilizing data provided by sensors with device becomes challenging. For example, if sensors are not time synchronized based on delays in querying remote sensors for data and receiving the data (as well as delays in intermediary systems, such as messaging systems), the data may not be actionable according to required protocol.

BRIEF SUMMARY

This disclosure relates to computing systems and methods for data hub architecture to provide actionable data from remote sensor feeds. Methods, systems, and techniques for data hub architecture to provide actionable data from remote sensor feeds are provided.

According to an embodiment, a method for data hub architecture to provide actionable data from remote sensor feeds includes receiving, by a master hub of a plurality of data hubs, a request to access at least one first sensor in a first location and at least one second sensor in a second location from a data client, wherein a network includes the plurality of data hubs, and wherein the master hub is closest to the data client of the plurality of data hubs on the network, determining, by the master hub, a first data hub of the plurality of data hubs that is closest to the at least first sensor on the network, and determining, by the master hub, a second data hub of the plurality of data hubs that is closest to the at least one second sensor on the network. The method further includes querying, by the master hub, the first data hub for first data from the at least one first sensor, querying, by the master hub, the second data hub for second data from the at least one first sensor, and communicating, by the master hub, the first data and the second data to the data client.

According to another embodiment, a system for data hub architecture to provide actionable data from remote sensor feeds includes a master hub of a plurality of data hubs that receives a request to access at least one first sensor in a first location and at least one second sensor in a second location from a data client, wherein a network includes the plurality of data hubs, and wherein the master hub is closest to the data client of the plurality of data hubs on the network. The system further includes a first data hub of the plurality of data hubs that is closest to the at least first sensor on the network and retrieves first data from the at least one first second and a second data hub of the plurality of data hubs that is closest to the at least one second sensor on the network and retrieves second data from the at least one second sensor, wherein the master hub queries the first data hub for the first data, queries the second data hub for the second data and communicates the first data and the second data to the data client.

According to another embodiment, a non-transitory computer readable medium comprising a plurality of machine-readable instructions which when executed by one or more processors of a server are adapted to cause the server to perform a method for data hub architecture to provide actionable data from remote sensor feeds including receiving, by a master hub of a plurality of data hubs, a request to access at least one first sensor in a first location and at least one second sensor in a second location from a data client, wherein a network includes the plurality of data hubs, and wherein the master hub is closest to the data client of the plurality of data hubs on the network, determining, by the master hub, a first data hub of the plurality of data hubs that is closest to the at least first sensor on the network, and determining, by the master hub, a second data hub of the plurality of data hubs that is closest to the at least one second sensor on the network. The method further includes querying, by the master hub, the first data hub for first data from the at least one first sensor, querying, by the master hub, the second data hub for second data from the at least one first sensor, and communicating, by the master hub, the first data and the second data to the data client.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Figure 1:
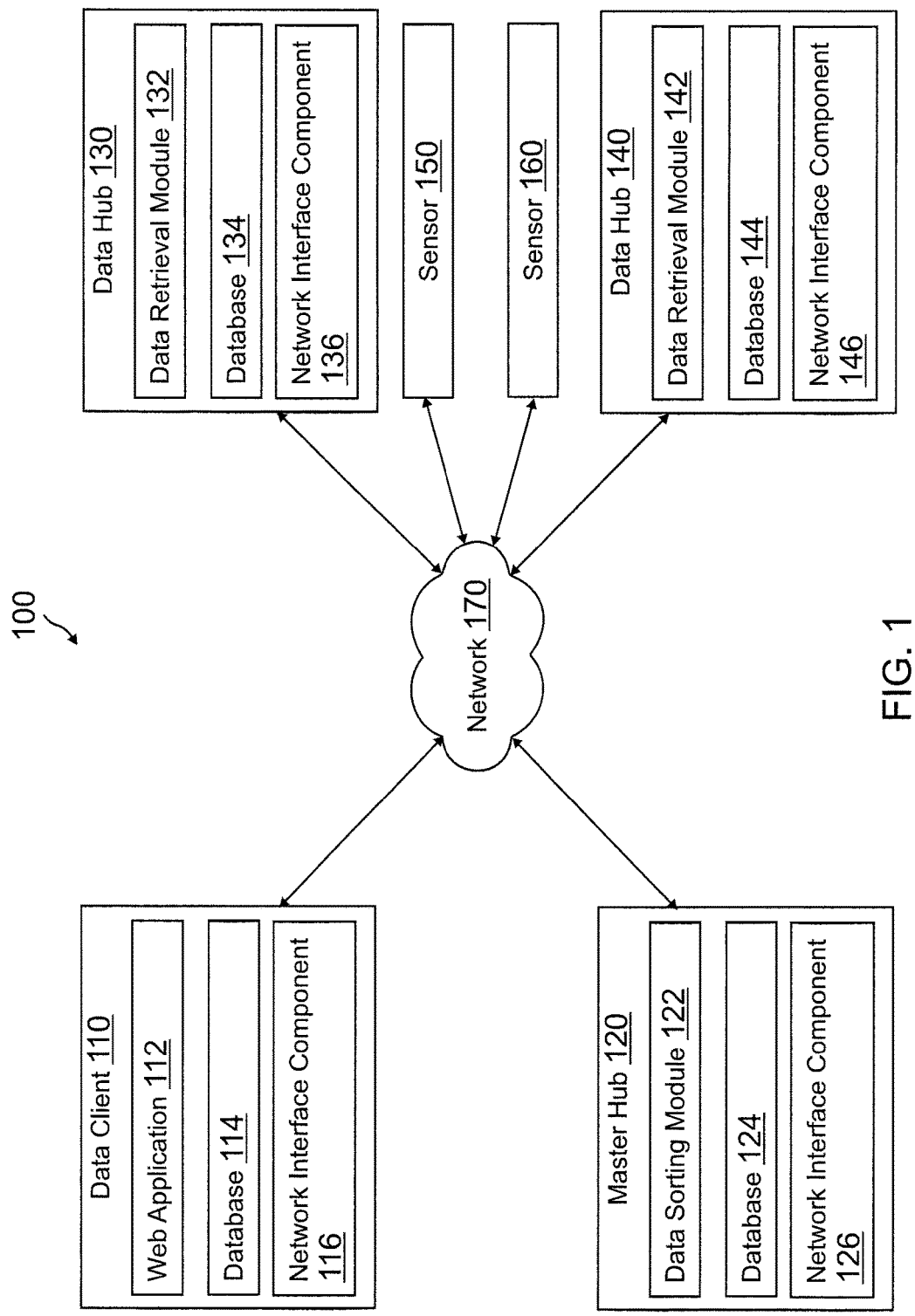
FIG. 1 is a block diagram illustrating a networked system suitable for implementing the processes described herein, according to an embodiment.

FIG. 1 is a block diagram illustrating a networked system suitable for implementing the processes described herein, according to an embodiment. Terms like "machine," "device," "computer," and "computing system" are used interchangeably and synonymously throughout this document.

System 100 may correspond to a network of computing system, including client and/or server computing systems. In this regard, system 100 of FIG. 1 includes a data client 110, a master hub 120, a data hub 130, a data hub 140, a sensor 150, and a sensor 160. Network 170 may correspond to a single or combination of networks, such as the Internet or an intranet. Data client 110 may request data from one or more of sensors 150/160, which may be remote from data client so that a query for data from data client 110 and a transmission of data to data client 110 include some delay in signal transmission. In order to provide actionable data according to a correct time of capture of the data by one or more of sensors 150/160, master hub 120 may be established that is closest to data client 110 on network 170 (e.g., has the shortest signal transmission pathway on network 170 so that the delay in querying and receiving data from master hub 120 is minimized). Master hub 120 may then determine data hub 130/150 that is closest to sensor 150/160 on network 170. For example, data hub 130 may be closest to sensor 150 on network 170 such that the signal transmission pathway is the shortest between data hub 130 and sensor 150 on network 170. Data hub 140 may similarly be determined for sensor 160. Master hub 120 may the establish a time difference between data hub 130 and data hub 140 that may correspond to the difference in delay between signal transmissions between master hub 120 and data hub 130 and signal transmissions between master hub 120 and data hub 140. Using the time difference, master hub 120 may properly query data hub 130 and data hub 140 for data from sensor 150 and sensor 160, respectively, and provide synchronized data to data client 110 so that the data is actionable as being time synchronized data from sensor 150 and sensor 160.

It should be appreciated that each of the devices utilized by users may be implemented as system 100 in a manner as follows. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities Data client 110, master hub 120, data hub 130, data hub 140, sensor 150, and sensor 160 may each include one or more processors, memories, attached devices, sensors, and/or other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Data client 110 may be implemented as a communication device that may utilize appropriate hardware and software configured for wired and/or wireless communication with master hub 120, data hub 130, data hub 140, sensor 150, and/or sensor 160. Data client 110 may be utilized by a user to retrieve data from sensor 150 and/or sensor 160, which may be located remotely from data client 110 such that a query for data and a response of the data may include delay in signal transmission over network 170. In various embodiments, data client 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, communication device included with or attached to another device, and/or other types of computing devices capable of transmitting and/or receiving data, such as an IPAD® from APPLE®. The client device may be managed or controlled by any suitable processing device. Although only one device is shown, a plurality of devices may function similarly.

Data client 110 of FIG. 1 contains a web application 112, a database 114, and a network interface component 116. Web application 112 may correspond to executable processes, procedures, and/or applications with associated hardware. In other embodiments, data client 110 may include additional or different hardware and software as required.

Web application 112 may correspond to one or more processes to execute modules and associated devices of data client 110 to establish master hub 120 when querying sensors 150/160 for data, communicate a query for data to master hub 120, and receive data detected by sensors 150/160 from master hub 120. In this regard, web application 112 may correspond to specialized hardware and/or software utilized by data client 110 where a user may enter a query for data from sensors 150/160. Thus, data client 110 may specify the sensors that data client 110 wishes to collect in, for example, sensors 150 and 160 in system 100. Once a query for data from sensor 150 and/or sensor 160 is entered, a plurality of data hubs on network 170 may be determined (e.g., master hub 120, data hub 130, data hub 140, and other data hubs residing on network 170). From the plurality of data hubs, master hub 120 may be chosen so that master hub 120 resides closest to data client 110 on network 170. Master hub 120 may be determined to be closest to data client 110 on network 170 where the data signal transmission pathway is shortest. For example, signals travelling between data client 110 and master hub 120 may have the shortest delay so that the signaling pathway is the shortest between data client 110 and master hub 120. In other embodiments, other factors may also contribute to the speed (e.g., amount of delay) in communicating signals between data client 110 and one or more of the data hubs of the plurality of data hubs. Thus, analysis of such factors may cause master hub 120 to be selected over a closer hub where the delay in signal transmissions between data client 110 and master hub 120 is shorter when picking master hub 120 over a "closer" data hub having a shorter signal transmission pathway but higher delay in signal transmissions.

After selection of master hub 120 is performed, master hub 120 may select data hub 130 and data hub 140 after determining that data hub 130 and data hub 140 is closest to sensor 150 and sensor 160, respectively, as explained herein. Web application 112 may then communicate the query to master hub 120 for processing by master hub 120. After master hub 120 determines a time difference between data hub 130 and data hub 140, master hub may query data hub 130 and data hub 140 for data from sensor 150 and sensor 160, respectively, as explained herein. After receiving data from data hub 130 and data hub 140, master hub 120 may provide the data to data client 110 through web application 112. Thus, web application 112 may display the data captured by sensor 150 and sensor 160 through an output interface. Web application 112 may also provide metadata included with the data, such as timestamps, locations of collection of the data, a table number of the data from a materialized table view of a database including the data, or other metadata.

Data client 110 may further include database 114 stored to a transitory and/or non-transitory memory of data client 110, which may store various applications and data and be utilized during execution of various modules of data client 110. Thus, database 114 may include, for example, identifiers such as operating system registry entries, cookies associated with web application 112, identifiers associated with hardware of data client 110, or other appropriate identifiers, such as identifiers used for a user account and/or with queries for data by data client 110. Database 114 may include additional information received from master hub 120, such as data collected by sensor 150 and sensor 160 and metadata associated with the collected data.

Data client 110 includes network interface component 116 adapted to communicate with network 170, such as with one or more data hubs and sensors including master hub 120, data hub 130, data hub 140, sensor 150, and/or sensor 160. In various embodiments, network interface component 116 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Master hub 120 may be implemented as a server or other computing device (e.g., client computing device) that may be established as a master hub of a plurality of data hubs in closest proximity to data client 110 on network 170. Master hub 120 may further determine data hub 130 is in closest proximity to sensor 150 on network 170 and data hub 140 is in closest proximity to sensor 160 on network 170. In this regard, master hub 120 includes one or more processing applications which may be configured to interact with data client 110 to receive a query for data from sensor 150 and sensor 160, establish data hub 130 and data hub 140 for use in receiving data from sensor 150 and sensor 160, respectively, establish a time difference in signal transmission delay between signals communicated between master hub 120 and data hub 130 and signals communicated between master hub 120 and data hub 140, query data hub 130 and data hub 140 for data using the time difference so that data received from data hub 140 is time synchronized with data received from data hub 150, and communicate the data to data client 110. Although a server is shown, the server may be managed or controlled by any suitable processing device.

Master hub 120 of FIG. 1 contains a data sorting module 122, a database 124, and a network interface component 126. Data sorting module 122 may correspond to executable processes, procedures, and/or applications with associated hardware. In other embodiments, master hub 120 may include additional or different hardware and software as required.

Data sorting module 122 may correspond to one or more processes to execute modules and associated devices of master hub 120 to receive a query for data from sensor 150 and sensor 160, establish data hub 130 and data hub 140 for use in receiving data from sensor 150 and sensor 160, respectively, establish a time difference in signal transmission delay between signals communicated between master hub 120 and data hub 130 and signals communicated between master hub 120 and data hub 140, query data hub 130 and data hub 140 for data using the time difference so that data received from data hub 140 is time synchronized with data received from data hub 150, and communicate the data to data client 110. In this regard, data sorting module 122 may correspond to specialized hardware and/or software that first receives a query for data from sensor 150 and/or sensor 160, for example, from web application 112 (e.g., when a user or device associated with data client 110 requires data from sensor 150 and sensor 160). Once received, data sorting module 122 may process the query to determine that the query includes a request for data from sensor 150 and sensor 160 (e.g., a request to access sensor 150 and sensor 160 to receive the data).

Data sorting module 122 may then determine which data hubs out of a plurality of data hubs are closest to each of sensor 150 and sensor 160. Network 170 may include a plurality of data hubs that are established over multiple locations, such as through the world where network 170 corresponds to the Internet. Data sorting module 122 of master hub 120 may determine that a data hub (e.g., data hub 130 and/or data hub 140) is closest to a sensor (e.g., sensor 150 and/or sensor 160) by determining that the data hub is in closest proximity to the sensor on network 170. Similar to master hub 120 being located closest to data client 110 on network 170, data sorting module 122 may determine that a data hub is closest to a sensor based on the delay in signal transmission between a data hub and a sensor. Thus, a data hub may be closest to a sensor on network 170 when the data hub and a sensor have the least delay in signal transmission between the data hub and the sensor on network 170 out of the plurality of data hubs available on network 170. As discussed in reference to system 100 of FIG. 1, data sorting module 122 may determine that data hub 130 is closest to sensor 150 and data hub 140 is closest to sensor 160 on network 170. Thus, the amount of delay in querying sensor 150 by data hub 130 for data and receiving the data from sensor 150 by data hub 130 is minimized. Similarly, the amount of delay in querying sensor 160 by data hub 140 for data and receiving the data from sensor 160 by data hub 140 is minimized. A determination of the closeness of a data hub to a sensor may include a data hub pinging a sensor to determine the delay between signal transmission and receipt of an acknowledgement of the ping (e.g., how long a signal takes to arrive at an endpoint and have the endpoint respond to acknowledge receipt of the signal). Additionally, data client 110 may ping master hub 120 or vice versa to determine the delay in signal transmission between data client 110 and master hub 120.

Once data sorting module 122 has established data hub 130 as closest to sensor 150 and data hub 140 as closest to sensor 160, data sorting module 122 may determine a delay in signal transmission between master hub 120 and data hub 130. The delay may be determined by pinging data hub 130 by data sorting module 122 or through another delay detection process. For example, the first delay may correspond to 200 milliseconds (ms) between master hub 120 and data hub 130. Similarly, data sorting module 122 may determine the delay in signal transmission between master hub 120 and data hub 140. The delay may also be determined by pinging data hub 140 by data sorting module 122 or through other delay detection processes. For example, the second delay may correspond to 300 ms between master hub 120 and data hub 130. Using the two delay determinations (e.g., the first delay of 200 ms and the second delay of 300 ms), data sorting module 122 may determine a time difference between data hub 130 and data hub 140, which may correspond to a difference in the amount of delay that master hub 120 has with data hub 130 (200 ms) and the amount of delay that master hub 120 has with data hub 140 (300 ms). Thus, the time difference between data hub 130 and data hub 140 for signal transmissions with master hub 120 corresponds to 100 ms difference between data hub 130 and data hub 140.

Once data sorting module 122 determines the time difference, data sorting module 122 may query data hub 130 and data hub 140 to retrieve data from sensor 150 and sensor 160, respectively, using the time delay. Master hub 120 may utilize the time delay so that first data received from data hub 130 and second data received from data hub 140 is time synchronized. Data hub 130 and data hub 140 may retrieve data from sensor 150 and sensor 160, respectively, and use data federation software to enter the data into a database, as explained herein. Data hub 130 and data hub 140 may add a timestamp to the first data and the second data, respectively, in a materialized view of a database table, as explained herein, and provide the first data and the second data to data sorting module 122. Data sorting module 122 may use data federation to connect to data hubs 130 and 140 and query data hubs 130 and 140 with a "SELECT UNION" query such that data sorting module 122 may sort the data according to the time difference and time stamps. Thus, data sorting module 122 may synchronize the first data received from data hub 130 with the second data received from data hub 140. Once received, data sorting module 122 may store the data to database 124 and/or stream the data to data client 110 after sorting so that the first data from sensor 150 is synchronized to the second data from sensor 160 when received by web application 112 and is actionable by data client 110.

Master hub 120 may further include database 124 stored to a transitory and/or non-transitory memory of master hub 120, which may store various applications and data and be utilized during execution of various applications and modules of master hub 120. Database 124 may store identifiers used to identify and communicate with various devices, servers, and/or sensors, for example, identifiers associated with client device 110, data hub 130, data hub 140, sensor 150, and/or sensor 160. Database 124 may also store received information, such as a request to access sensors 150/160 (e.g., a query for data from sensors 150/160) as well as received data from data hubs 130/140.

Master hub 120 includes network interface component 126 adapted to communicate with client device 110, data hub 130, data hub 140, sensor 150, and/or sensor 160. In various embodiments, network interface component 126 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data hub 120 and data hub 130 may be implemented as a server or other computing device (e.g., client computing device) that may be established as a data hub of a plurality of data hubs in closest proximity to sensor 150 and sensor 160, respectively, on network 170. As discussed herein, master hub 120 may have determined data hub 130 is in closest proximity to sensor 150 on network 170 and data hub 140 is in closest proximity to sensor 160 on network 170. Data hubs 130 and 140 may be utilized to retrieve data from sensors 150 and 160, respectively, when master hub 120 request data from sensors 150 and 160. In this regard, data hubs 130 and 140 includes one or more processing applications which may be configured to interact with master hub 120 to receive a request for data from master hub 120, begin pulling data from sensors 150 and 160, respectively, use federation data processes to add the data from sensors 150 or 160 to a database table with timestamps for each data entry in the table, and communicate the data from sensors 150 or 160 to master hub 120. Although a server is shown, the server may be managed or controlled by any suitable processing device.

Data hubs 130/140 of FIG. 1 contain data retrieval modules 132/142, databases 134/144, and network interface components 136/146, respectively. Data retrieval modules 132/142 may correspond to executable processes, procedures, and/or applications with associated hardware. In other embodiments, Data hubs 130/140 may include additional or different hardware and software as required.

Data retrieval modules 132/142 may correspond to one or more processes to execute modules and associated devices of data hubs 130/140, respectively to receive a request from master hub 120 for data detected by sensors 150/160, respectively, collect the data to a database table/object to create a materialized view including the data and a timestamp for each datum in the data, and communicate the data to master hub 120 for sorting by data sorting module 122. In this regard, data retrieval modules 132/142 may correspond to specialized hardware and/or software that may first begin in an IDLE state, where data hubs 130/140 are not requesting data from sensors 150/160, respectively. Once data hubs 130/140 receive a request for data from sensors 150/160, data retrieval modules 132/142 may move data hubs 130/140, respectively, to a SENDING state, where data hubs 130/140 begin pulling data from sensors 150/160, respectively (e.g., activate and/or retrieve data using sensors 150/160, such as data for real world conditions, events, and/or locations associated with sensors 150/160). In the SENDING state, data retrieval modules 132/142 may begin the process of collecting data for data client 110.

In order to provide actionable data to master hub 120 and thus data client 110, data retrieval modules 132/142 may clear one or more materialized views of a database table/object prior to collecting data from sensors 150/160, respectively. Once data retrieval modules 132/142 move to the SENDING state, data retrieval modules 132/142 may begin filling their respective database tables/objects with data retrieved from sensors 150/160, respectively. Thus, data retrieval modules 132/142 may fill a materialized view of the database tables/objects with data retrieved from sensors 150/160, respectively. The materialized view filled by data retrieval modules 132/142 may include a plurality of data fields having individual datum readings in the data. The materialized view in the database table/field may further include a time stamp for each datum in the database table/object. The time stamps may be used to determine when an entry of the data in the database table/field was captured. Data retrieval module 132/142 may the provide data in the materialized view to master hub 120, which may receive and sort the data as time synchronized using the time difference determined by data sorting module 122, as discussed herein.

Data hubs 130/140 may further each include databases 134/144, respectively, stored to a transitory and/or non-transitory memory of data hubs 130/140, which may store various applications and data and be utilized during execution of various applications and modules of data hubs 130/140. Databases 134/144 may store identifiers used to identify and communicate with various devices, servers, and/or sensors, for example, identifiers associated with client device 110, master hub 120, sensor 150, and/or sensor 160. Database 134/144 may also store received information, such as a data pulled from sensors 150/160, respectively, which is stored to a materialized view of a database table/object.

Data hubs 130/140 each include a network interface component 136/146 adapted to communicate with client device 110, master hub 120, sensor 150, and/or sensor 160. In various embodiments, network interface component 136/146 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Sensors 150/160 may be implemented as a sensing device that may collect data from a location or other environment that sensors 150/160 are stored to. For example, sensors 150/160 may correspond to sensors to detect light, sound, atmospheric conditions, human or other living organism's parameters, chemical, physical, or biological information, or other types of sensors. Sensors 150/160 may be configured to stream data to data hubs 130/140, respectively, so that the data may be stored with time stamps in order to allow for synchronized data.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
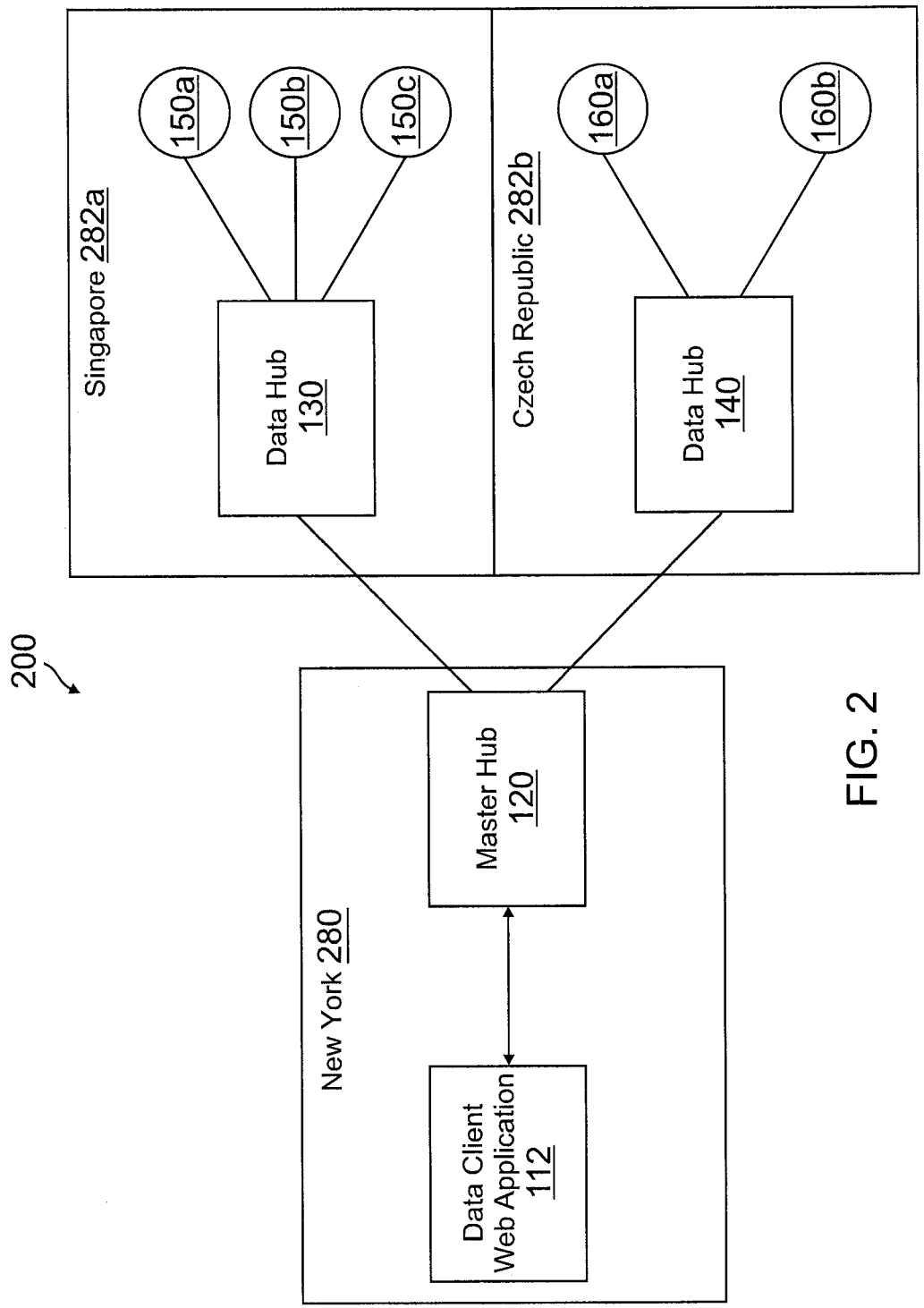
FIG. 2 is a simplified block diagram illustrating exemplary data hub architecture to provide actionable data from remote sensor feeds, according to an embodiment.

FIG. 2 is a simplified block diagram illustrating exemplary data hub architecture to provide actionable data from remote sensor feeds, according to an embodiment. Although the components of system 200 are shown residing as separately connected devices or components, it is understood structures shown in system 200 may be included in the same device. For example, a data client may be included within or local to a master hub establishing a time difference between one or more data hubs and querying the one or more data hubs, while a sensor may be included within or local to a data hub used to collect data from the sensor.

Data client web application 112 in system 200 may be utilized to initiate a retrieval of data from a sensor 150a, a sensor 150b, a sensor 150c, a sensor 160a, and a sensor 160b. Sensors 150a-c may correspond generally to sensor 150 in FIG. 1. Similarly, sensors 160a and 160b may correspond generally to sensor 160 in FIG. 1. Once data client web application 112 receives a query from sensors 150a-c, 160a, and 160b, data client web application 112 may utilize master hub 120 to determine data hubs closest to sensors 150a-c, 160a, and 160b. As discussed herein, master hub 120 may be the closest data hub of a plurality of data hubs so that delays in data signal transmissions between data client web application 112 and master hub 120 are minimized. For example, data client web application 112 and master hub 120 may be located within a geographic region of New York 280. Master hub 120 may register as located in a region. Thus, when data client web application 112 provides information associating data client web application 112 as also located within or nearby that region, master hub 120 may be established as the master hub based on the similarity in location data. In other embodiments, data client web application 112 may ping one or more of the plurality of data hubs accessible on a network (or vice versa) to determine master hub 120 as the closest hub to data client web application 110.

Once master hub 120 is determined, master hub may receive the query for data from sensors 150a-c, 160a, and 160b. As shown in environment 200, the query to access and receive data from sensors 150a-c, 160a, and 160b includes two parts, a first query for first data from sensors 150a-c in Singapore 282a and a second query for second data from sensors 160a and 160b in Czech Republic 282b. Thus, sensors 150a-c are located remotely from sensors 160a and 160b. In order to receive actionable data that is time synchronized between sensors 150a-c, 160a, and 160b, master hub 120 may determine a data hub available on a network that is in proximity to sensors 150a- and/or closest to sensors 150a-c on the network as well as a data hub that is in proximity to sensors 160a and 160b and/or closest to sensors 160a and 160b on the network. Thus, master hub determines that a data hub 130 is closest to sensors 150a-c so that data signals from sensors 150a-c will have the least delay in travelling to data hub 130. As shown in environment 200, data hub 130 is also located within or in proximity to Singapore 282a. As previously discussed, data hub 130 may register as located within or in proximity to the location of sensors 150a-c, or data hub 130 may ping sensors 150a-c to determine a delay in signal transmission when communicating with sensors 150a-c. Similarly, master hub 120 may determine data hub 140 is best situated to receive data from sensors 160a and 160b with the least amount of delay.

Once data hub 130 is established to retrieve data from sensors 150a-c and data hub 140 is established to receive data from sensors 160a and 160b, master hub 120 may then query data hub 130 and data hub 140 for data from their respective sensors. Master hub may utilize a time difference between signal transmission delays from data hub 130 and from data hub 140 to query data hub 130 and data hub 140. The time difference may be established based on a first amount of delay in communicating a signal to data hub 130 and a second amount of delay in communicating a signal to data hub 140. Once the time difference is established, master hub 120 may store the time difference for use in querying data hub 130 and data hub 140 as well as for use in sorting data received from data hub 130 and data hub 140.

As discussed herein, data hub 130 may clear all or part of the materialized views in a database table/object of a federated database when data hub 130 is not actively pulling data from sensors 150*a-c*. Once data hub 130 moves to a state where data hub 130 is pulling data from sensors 150*a-c*, data hub 130 may begin filling a materialized view of the database table/object using data retrieved from sensors 150*a-c*. The materialized view may include a number for each data reading (e.g., datum) in the first data retrieved from sensors 150*a-c* as well as a time stamp for each data. Similarly, data hub 140 may use a federated database to store second data from sensors 160*a* and 160*b* to a database table/object of data hub 140 with numberings and/or time stamps for each datum in the second data. Using the time stamp and the time difference, the first data provided by data hub 130 to master hub 120 may be time synchronized with the second data provided by data hub 140 to master hub 120.

Master hub 120 may then receive the first data and the second data from data hub 130 and data hub 140, respectively. Using data federation, master hub 120 may sort the first and second data to a database table/object, where the first and second data is time synchronized within the table so that the first data and the second data are actionable as time synchronized data (and not data that may be received at the same time by master hub 120 but occurring at two different time periods, for example, if master hub 120 did not use the time difference to account for delay in signal transmission of the first or second query and/or response of the first or second data). Master hub 120 may then communicate the first data and the second data after sorting to data client web application 112. In other embodiments, master hub 120 may not sort and store the first data and the second data to a database table/field and may sort the first data and the second data and directly stream the results to data client web application 112.

Figure 3:
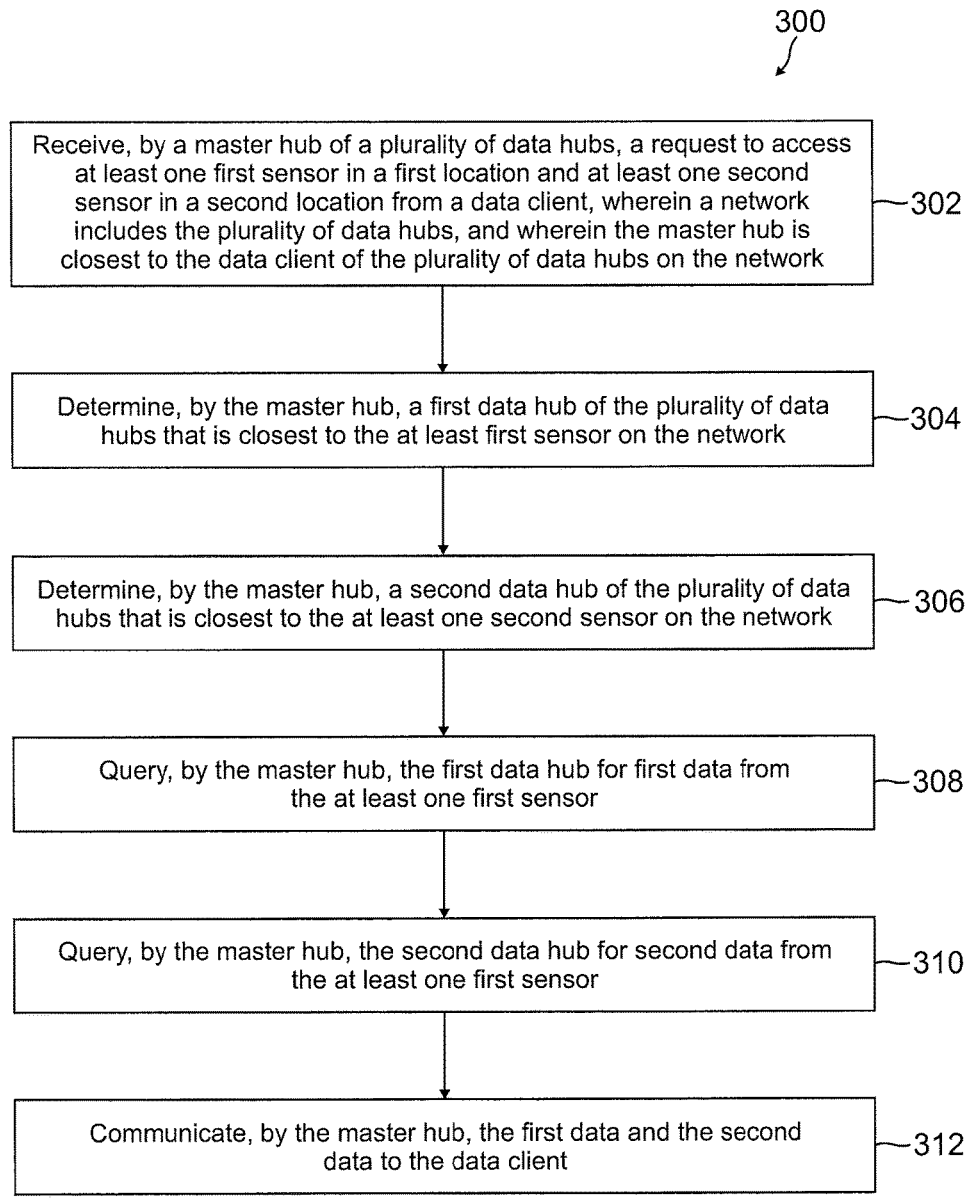
FIG. 3 is a flowchart illustrating an exemplary process for use with data hub architecture to provide actionable data from remote sensor feeds, according to an embodiment.

FIG. 3 is a flowchart illustrating an exemplary process for use with data hub architecture to provide actionable data from remote sensor feeds, according to an embodiment. Note that one or more steps, processes, and methods described herein may be omitted, performed in a different sequence, or combined as desired or appropriate.

At step 302, a request to access at least one first sensor in a first location and at least one second sensor in a second location is received from a data client by a master hub of a plurality of data hubs, wherein a network includes the plurality of data hubs, and wherein the master hub is closest to the data client of the plurality of data hubs on the network. The master hub may be located in the same or similar geographic region and may be determined by the data client or one or more of the plurality of data hubs (including the master hub) using ping detection or registered locations of the data client and the master hub.

At step 304, a first data hub of the plurality of data hubs that is closest to the at least first sensor on the network is determined by the master hub. Moreover, at step 306, a second data hub of the plurality of data hubs that is closest to the at least one second sensor on the network is determined by the master hub. Similar to the master hub, the first data hub and the second data hub may be determined to be closest to the at least one first sensor and the at least one second sensor, respectively, using ping detection of signal transmission delays by the first data hub with the at least one first sensor and/or by the second data hub with the at least one second sensor. In other embodiments, the first data hub and the second data hub may be determined to be closest to the at least one first sensor and the at least one second sensor, respectively, through registered locations and/or location identification (e.g., location coordinates) of the first data hub, the second data hub, the at least one first sensor, and/or the at least one second sensor.

At step 308, the first data hub is queried by the master hub for first data from the at least one first sensor. Similarly, at step 310, the second data hub is queried by the master hub for second data from the at least one first sensor. Prior to the querying, by the master hub, the first data hub and/or the second data hub, the master hub may determine a first time delay between the master hub and the first data hub and a second time delay between the master hub and the second data hub. The first time delay may comprise a first amount of time to receive, by the master hub, a first data signal from the first data hub. Additionally, the second time delay may comprise a second amount of time to receive, by the master hub, a second data signal from the second data hub. The master hub may determine the first time delay by pinging the first data hub by the master hub to determine the first amount of time. The master hub may also determine the second time delay by pinging the second data hub by the master hub to determine the second amount of time. Thus, prior to the master hub querying the first data hub and the second data hub, the master hub may determine a time difference between receiving the first data signal from the first data hub and receiving the second data signal from the second data hub using the first time delay and the second time delay.

The first data hub may comprise a first federated database system using data federation to retrieve the first data from the at least one first sensor and the second data hub may comprise a second federated database system using data federation to retrieve the second data from the at least one second sensor. Thus, the first data hub may fill a first materialized view with the first data from the at least one first sensor, wherein the first materialized comprises at least a first data column comprising the first data and a first timestamp column comprising at least one first timestamp for each datum in the first data, wherein the at least one first timestamp comprises at least one first time that the each datum in the first data is collected by the at least one first sensor. Similarly, the second data hub may fill a second materialized view with the second data from the at least one second sensor, wherein the second materialized comprises at least a second data column comprising the second data and a second timestamp column comprising at least one second timestamp for each datum in the second data, wherein the at least one second timestamp comprises at least one second time that the each datum in the second data is collected by the at least one second sensor. The master hub may then use the time difference to synchronize querying the first data hub for the first data and querying the second data hub for the second data so that the at least one first timestamp and the at least one second timestamp match.

Once the first data and the second data are received by the master hub, at step 312, the first data and the second data to the data client is communicated to the data client. In various embodiments, the master hub may comprise a master federated database system using data federation to retrieve the first data from the first data hub and the second data from the second data hub. Thus, prior to communicating, by the master hub, the first data and the second data to the data client, the master hub may receive the first data from the first data hub and the second data from the second data hub. The master hub may further sort the first data and the second data according to the at least one first timestamp and the at least one second timestamp, for example, using the time difference. The master hub may then stream the first data and the second data to the data client after sorting the first data and the second data. The master hub may use a select union query when querying the first data hub for the first data, querying the second data hub for the second data, and sorting the first data and the second data.

Figure 4:
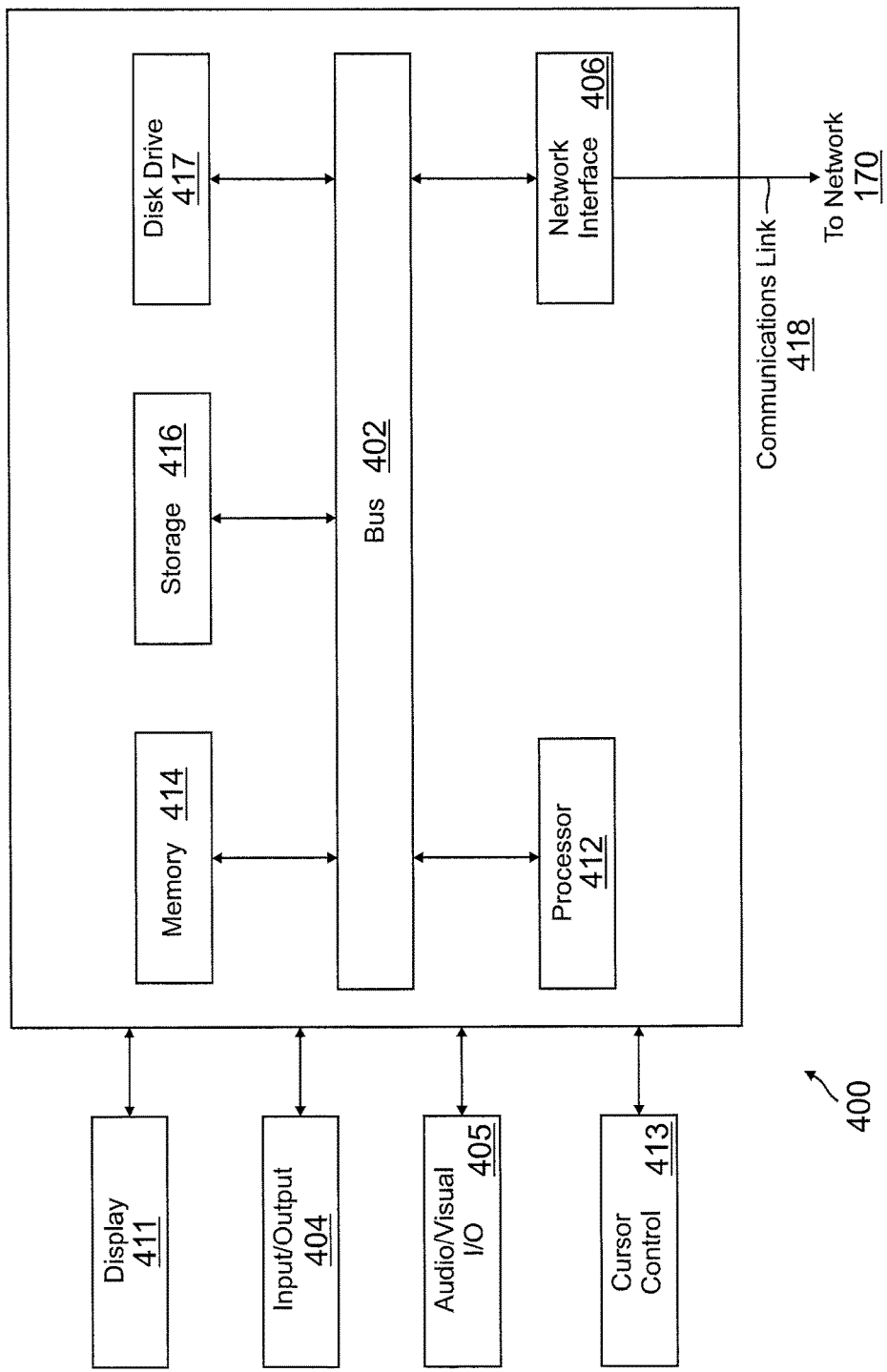
FIG. 4 is a block diagram illustrating a computer system suitable for implementing one or more components in FIG. 1, according to an embodiment.

FIG. 4 is a block diagram illustrating a computer system suitable for implementing one or more components in FIG. 1, according to an embodiment. In various embodiments, the data client may comprise a personal computing device (e.g., smart phone, a computing tablet, a personal computer, laptop, a wearable computing device such as glasses or a watch, Bluetooth device, key FOB, badge, etc.) capable of communicating with the network. The master and/or data hubs may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another communication device, service device, or a service provider server via network 170. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, in-store purchases have been described, but advantages discussed herein may also be achieved through online purchases. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   receiving, by at least one hardware processor of a master hub selected by a data client based on a first shortest signal pathway between the master hub and the data client, a specification of a plurality of data sensors;
   determining a plurality of data hubs associated with the plurality of sensors on a network, wherein each of the plurality of data hubs is associated with one of the plurality of data sensors for retrieving data from the one of the plurality of data sensors;
   receiving, by the at least one hardware processor of the master hub of the plurality of data hubs, a request to access at least one first sensor in a first location of the plurality of sensors and at least one second sensor in a second location of the plurality of sensors from a data client;

determining, by the at least one hardware processor of the master hub, a first data hub of the plurality of data hubs based on a second shortest signal pathway between the first data hub and the at least one first sensor on the network;

determining, by the at least one hardware processor of the master hub, a second data hub of the plurality of data hubs based on a third shortest signal pathway between the second data hub and the at least one second sensor on the network;

querying, by the at least one hardware processor of the master hub, the first data hub for first data from the at least one first sensor;

receiving, by the master hub from the first data hub, the first data comprising first datum and first metadata for the first datum comprising at least one first timestamp;

querying, by the at least one hardware processor of the master hub, the second data hub for second data from the at least one first sensor;

receiving, by the master hub from the second data hub, the second data comprising second datum and second metadata for the second datum comprising at least one second timestamp;

determining, by the master hub, a time difference between the first data and the second data using the at least one first timestamp and the at least one second timestamp;

synchronizing, by the master hub, the first data with the second data using the at least one first timestamp and the at least one second timestamp; and communicating, by the at least one hardware processor of the master hub, the first data and the second data to the data client based on the synchronizing, wherein the first data and the second data are output in a synchronized data output based on the at least one first timestamp and the at least one second timestamp.

2. The method of claim 1, wherein prior to the querying, by the master hub, the first data hub and the second data hub, the method further comprises:

determining, by the master hub, a first time delay between the master hub and the first data hub; and determining, by the master hub, a second time delay between the master hub and the second data hub.

3. The method of claim 2, wherein the first time delay comprises a first amount of time to receive, by the master hub, a first data signal from the first data hub, and wherein the second time delay comprises a second amount of time to receive, by the master hub, a second data signal from the second data hub.

4. The method of claim 3, wherein the determining, by the master hub, the first time delay comprises pinging the first data hub by the master hub to determine the first amount of time, and wherein the determining, by the master hub, the second time delay comprises pinging the second data hub by the master hub to determine the second amount of time.

5. The method of claim 4, wherein determining the first time delay and the second time delay.

6. The method of claim 5, wherein the first data hub comprises a first federated database system to retrieve the first data from the at least one first sensor, and wherein the second data hub comprises a second federated database system to retrieve the second data from the at least one second sensor.

7. The method of claim 6, wherein the first data hub fills a first materialized view for the synchronized data output with the first data from the at least one first sensor, wherein the first materialized comprises at least a first data column comprising the first data and a first timestamp column comprising the at least one first timestamp for each of the first datum in the first data, wherein the at least one first timestamp comprises at least one first time that the each of the first datum in the first data is collected by the at least one first sensor, and wherein the second data hub fills a second materialized view for the synchronized data output with the second data from the at least one second sensor, wherein the second materialized comprises at least a second data column comprising the second data and a second timestamp column comprising the at least one second timestamp for each of the second datum in the second data, wherein the at least one second timestamp comprises at least one second time that the each of the second datum in the second data is collected by the at least one second sensor.

8. The method of claim 7, wherein the master hub uses the time difference to synchronize the querying, by the master hub, the first data hub for the first data and the querying, by the master hub, the second data hub for the second data so that the at least one first timestamp and the at least one second timestamp match.

9. The method of claim 8, wherein the master hub comprises a master federated database system to retrieve the first data from the first data hub and the second data from the second data hub, wherein prior to the communicating, by the master hub, the first data and the second data to the data client, the method further comprises:

receiving, by the master hub, the first data from the first data hub;

receiving, by the master hub, the second data from the second data hub; and sorting, by the master hub, the first data and the second data according to the at least one first timestamp and the at least one second timestamp, and wherein the communicating, by the master hub, the first data and the second data to the data client comprises streaming the first data and the second data to the data client in the synchronized data output using the sorting, by the master hub, the first data and the second data.

10. The method of claim 9, wherein the master hub uses a select union query for the querying, by the master hub, the first data hub for the first data, the querying, by the master hub, the second data hub for the second data, and the sorting, by the master hub, the first data and the second data.

11. A system comprising:

a master hub, comprising at least one first hardware processor, of a plurality of data hubs selected by a data client based on a first shortest signal pathway on a network between the master hub and the data client that receives a specification of a plurality of data sensors, determines the plurality of data hubs associated with the plurality of sensors, wherein each of the plurality of data hubs is associated with one of the plurality of data sensors for retrieving data from the one of the plurality of data sensors, and receives a request to access at least one first sensor in a first location of the plurality of sensors and at least one second sensor in a second location of the plurality of sensors from the data client;

a first data hub, comprising at least one second hardware processor, of the plurality of data hubs selected by the master hub based on a second shortest signal pathway between the first data hub and the at least one first sensor on the network and retrieves first data from the at least one first sensor;

a second data hub, comprising at least one third hardware processor, of the plurality of data hubs selected by the master hub based on a third shortest signal pathway between the second data hub and the at least one second sensor on the network and retrieves second data from the at least one second sensor, wherein the master hub queries the first data hub for the first data, receives the first data comprising first datum and first metadata for the first datum comprising at least one first timestamp from the first data hub, queries the second data hub for the second data, receives the second data comprising second datum and second metadata for the second datum comprising at least one second timestamp from the second data hub, determines a time difference between the first data and the second data using the at least one first timestamp and the at least one second timestamp, synchronizes the first data with the second data using the at least one first timestamp and the at least one second timestamp, and communicates the first data and the second data to the data client based on synchronizing the first data and the second data, wherein the first data and the second data are output in a synchronized data output based on the at least one first timestamp and the at least one second timestamp.

12. The system of claim 11, wherein prior to the master hub querying the first data hub and the second data hub, the master hub further determines a first time delay between the master hub and the first data hub and determines a second time delay between the master hub and the second data hub.

13. The system of claim 12, wherein the first time delay comprises a first amount of time for the master hub to receive a first data signal from the first data hub, and wherein the second time delay comprises a second amount of time for the master hub to receive a second data signal from the second data hub.

14. The system of claim 13, wherein the master hub determines the first time delay by pinging the first data hub by the master hub to determine the first amount of time, and wherein the master hub determines the second time delay by pinging the second data hub by the master hub to determine the second amount of time.

15. The system of claim 14, wherein the master hub further determines the time difference using the first time delay and the second time delay.

16. The system of claim 15, wherein the first data hub comprises a first federated database system to retrieve the first data from the at least one first sensor, and wherein the second data hub comprises a second federated database system to retrieve the second data from the at least one second sensor.

17. The system of claim 16, wherein the first data hub fills a first materialized view for the synchronized data output with the first data from the at least one first sensor, wherein the first materialized comprises at least a first data column comprising the first data and a first timestamp column comprising the at least one first timestamp for each of the first datum in the first data, wherein the at least one first timestamp comprises at least one first time that the each of the first datum in the first data is collected by the at least one first sensor, and wherein the second data hub fills a second materialized view for the synchronized data output with the second data from the at least one second sensor, wherein the second materialized comprises at least a second data column comprising the second data and a second timestamp column comprising the at least one second timestamp for each of the second datum in the second data, wherein the at least one second timestamp comprises at least one second time that the each of the second datum in the second data is collected by the at least one second sensor.

18. The system of claim 17, wherein the master hub uses the time difference to synchronize the querying, by the master hub, the first data hub for the first data and the querying, by the master hub, the second data hub for the second data so that the at least one first timestamp and the at least one second timestamp match.

19. The system of claim 18, wherein the master hub comprises a master federated database system to retrieve the first data from the first data hub and the second data from the second data hub, wherein prior to the master hub communicating the first data and the second data to the data client, the master hub further receives the first data from the first data hub, receives the second data from the second data hub, sorts the first data and the second data according to the at least one first timestamp and the at least one second timestamp, wherein the master hub communicates the first data and the second data to the data client by streaming the first data and the second data to the data client in the synchronized data output using the sorting, by the master hub, the first data and the second data.

20. A non-transitory machine-readable medium comprising a plurality of machine-readable instructions which when executed by one or more processors of an application server cause the application server to perform a method comprising:

receiving, by at least one hardware processor of a master hub selected by a data client based on a first shortest signal pathway between the master hub and the data client, a specification of a plurality of data sensors;

determining a plurality of data hubs associated with the plurality of sensors on a network, wherein each of the plurality of data hubs is associated with one of the plurality of data sensors for retrieving data from the one of the plurality of data sensors;

receiving, by the at least one hardware processor of the master hub of a plurality of data hubs, a request to access at least one first sensor in a first location of the plurality of sensors and at least one second sensor in a second location of the plurality of sensors from the data client;

determining, by the at least one hardware processor of the master hub, a first data hub of the plurality of data hubs based on a second shortest signal pathway between the first data hub and the at least one first sensor on the network;

determining, by the at least one hardware processor of the master hub, a second data hub of the plurality of data hubs that is closest to the at least one second sensor on the network;

querying, by the at least one hardware processor of the master hub, the first data hub for first data from the at least one first sensor;

receiving, by the master hub from the first data hub, the first data comprising first datum and first metadata for the first datum comprising at least one first timestamp;

querying, by the at least one hardware processor of the master hub, the second data hub for second data from the at least one first sensor;

receiving, by the master hub from the second data hub, the second data comprising second datum and second metadata for the second datum comprising at least one second timestamp;

determining, by the master hub, a time difference between the first data and the second data using the at least one first timestamp and the at least one second timestamp;

synchronizing, by the master hub, the first data with the second data using the at least one first timestamp and the at least one second timestamp; and communicating, by the at least one hardware processor of the master hub, the first data and the second data to the data client based on the synchronizing, wherein the first data and the second data are output in a synchronized data output based on the at least one first timestamp and the at least one second timestamp.

* * * * *